US012517369B2

(12) United States Patent
Chu (10) Patent No.: US 12,517,369 B2
(45) Date of Patent: Jan. 6, 2026

(54) OPTICAL POLARIZATION EFFECT DEMONSTRATING DEVICE

(71) Applicant: National Central University, Taoyuan (TW)

(72) Inventor: Ching-Chi Chu, Taoyuan (TW)

(73) Assignee: National Central University, Taoyuan (TW)

( * ) Notice: Subject to any disclaimer, the term of this patent is extended or adjusted under 35 U.S.C. 154(b) by 612 days.

(21) Appl. No.: 17/969,310

(22) Filed: Oct. 19, 2022

(65) Prior Publication Data
US 2024/0111167 A1    Apr. 4, 2024

(30) Foreign Application Priority Data

Sep. 30, 2022 (TW) .................................. 111137402

(51) Int. Cl.
*G02B 27/28* (2006.01)
*G02B 5/30* (2006.01)

(52) U.S. Cl.
CPC ......... *G02B 27/281* (2013.01); *G02B 5/3025* (2013.01)

(58) Field of Classification Search
CPC ...... G02B 27/281; G02B 5/3025; G02B 5/30; G02B 5/3033–305; G02B 5/3083; G02B 27/28; G02B 27/286; G02B 27/288; G02B 26/02; G02B 26/023
See application file for complete search history.

(56) References Cited

U.S. PATENT DOCUMENTS

| 2018/0052332 A1* | 2/2018 | Meng ................... G02B 27/281 |
| 2019/0235217 A1* | 8/2019 | Hasegawa .............. G02B 13/14 |
| 2020/0348529 A1* | 11/2020 | Sabaciag .............. G02B 5/3083 |
| 2021/0095117 A1* | 4/2021 | Katagiri .................. C08L 25/12 |

FOREIGN PATENT DOCUMENTS

CN      110349486 A    10/2019

OTHER PUBLICATIONS

Htstar, "Polarization Experiment Set Polarizer Demonstration Lab Optical Teaching Equipment", https://laboratory-apparatus.com/product/polarization-experiment-set-polarizer-demonstration-lab-optical-teaching-equipment, available online at least as of Dec. 18, 2019, accessed on May 27, 2025 (Year: 2019).*

* cited by examiner

*Primary Examiner* — Stephone B Allen
*Assistant Examiner* — Adam W Booher
(74) *Attorney, Agent, or Firm* — Demian K. Jackson; Jackson IPG PLLC (57) ABSTRACT

The present invention relates to an optical polarization effect demonstrating device. The device includes a first circular rotating polarization disk including a first main observation window and a first polarization film having a first polarization direction viewable through the first circular observation window; and a second circular rotating polarization disk including a second main observation window and a second polarization film having a second polarization direction viewable through the second circular observation window, wherein the first circular rotating polarization disk and the second circular rotating polarization disk are rotatably assembled in a concentric way such that the first circular rotating polarization disk and the second circular rotating polarization disk are rotatable with each other, and the first polarization direction is different from the second polarization direction.

8 Claims, 7 Drawing Sheets

OPTICAL POLARIZATION EFFECT DEMONSTRATING DEVICE

CROSS-REFERENCE TO RELATED APPLICATION

This application claims priority benefit to Taiwan Invention Patent Application Serial No. 111137402, filed on Sep. 30, 2022, in Taiwan Intellectual Property Office, the entire disclosures of which are incorporated by reference herein.

FIELD

The present invention relates to an optical polarization effect demonstrating device, in particular to a handheld and non-electric driven optical polarization effect demonstrating device.

BACKGROUND

In the field of basic science education, the optical polarization is undoubtedly a very important basic physics concept, for physics courses opened no matter in middle school, high school and university. It plays key role for understanding the characteristics of light. The polarization characteristic of light is also widely and extensively applied in daily life and in the field of modern science and technology.

The issue is that the optical polarization phenomena is not commonly seen everywhere in life, and its basic principles and concepts are quite abstract. It is somehow difficult for beginners to catch and understand. Learners usually need to rely on schematic diagrams and require a little capability of imagination to initially get a little idea to the optical polarization phenomena.

Taking the traditional physics experiment course as an example, in order to demonstrate the optical polarization phenomena, including Malus' Law, etc., it requires a series of complicated processes to set up instruments and a photometric process to calibrate and regulate the instruments, prior to the commencement of demonstration. In addition, almost most traditional optical polarization teaching aids require to secure the light source and polarized components, etc. onto the fixed tracks, so to demonstrate the optical polarization phenomena, the photoelastic effect, and more.

However, these traditional teaching aids usually have a relative large size, are merely suitable for operating independently in laboratory classrooms and fail to move into ordinary classrooms for demonstration. Also it requires being driven relying upon external power, and the operations thereof are also much complicated. Moreover, according to learners' feedbacks, after watching the demonstrations by these traditional teaching aids, many learners still have little understanding of the optical polarization.

Thus, in the field of science education, it is necessary to develop an innovative teaching aid that has much more fun, more simple and more intuitive, which facilitates the process of teaching and learning the phenomena of the optical polarization. The teaching aid is nothing else than to image the idea of optical polarization in such a way that everyone, in particular, a beginner, can grasp the fundamental concepts and have an idea of what the optical polarization is, and has the same level of performance with that of the traditional sophisticated experiment instruments.

Hence, there is a need to solve the above deficiencies/issues.

SUMMARY

The present invention relates to an optical polarization effect demonstrating device, in particular to a handheld and non-electric driven optical polarization effect demonstrating device.

The present invention provides an optical polarization effect demonstrating device. The device includes a first circular rotating polarization disk including a first main observation window and a first polarization film having a first polarization direction viewable through the first circular observation window; and a second circular rotating polarization disk including a second main observation window and a second polarization film having a second polarization direction viewable through the second circular observation window, wherein the first circular rotating polarization disk and the second circular rotating polarization disk are rotatably assembled in a concentric way such that the first circular rotating polarization disk and the second circular rotating polarization disk are rotatable with each other, and the first polarization direction is different from the second polarization direction.

Preferably, the first circular rotating polarization disk further includes a first circular ring framework having a circular ring framework and forming and surrounding the first circular observation window; the first polarization film having a first polarization direction, attached to the circular ring framework and shown through the first circular observation window; and a positioning ring attached to the first polarization film, having an inner diameter and forming and surrounding the first circular observation window.

Preferably, after the positioning ring is attached to the first polarization film, a cavity is formed by the positioning ring on the first circular rotating polarization disk.

Preferably, the second circular rotating polarization disk further includes a second circular ring framework having a framework and forming and surrounding the second circular observation window; the second polarization film having a second polarization direction, attached to the framework and shown through the second circular observation window; and an angular scale ring attached to the second polarization film, having an outer diameter less than the inner diameter and forming and surrounding the second circular observation window, wherein the angular scale ring includes a plurality of angle scales distributed between 0°-360° degrees.

Preferably, after the angular scale ring is attached to the second polarization film, a protrusion is formed by the angular scale ring on the second circular rotating polarization disk.

Preferably, an angular scale observation window is opened on and through the circular ring framework and corresponded to the plurality of angle scales included in the angular scale ring in position.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Figures 1, 2:
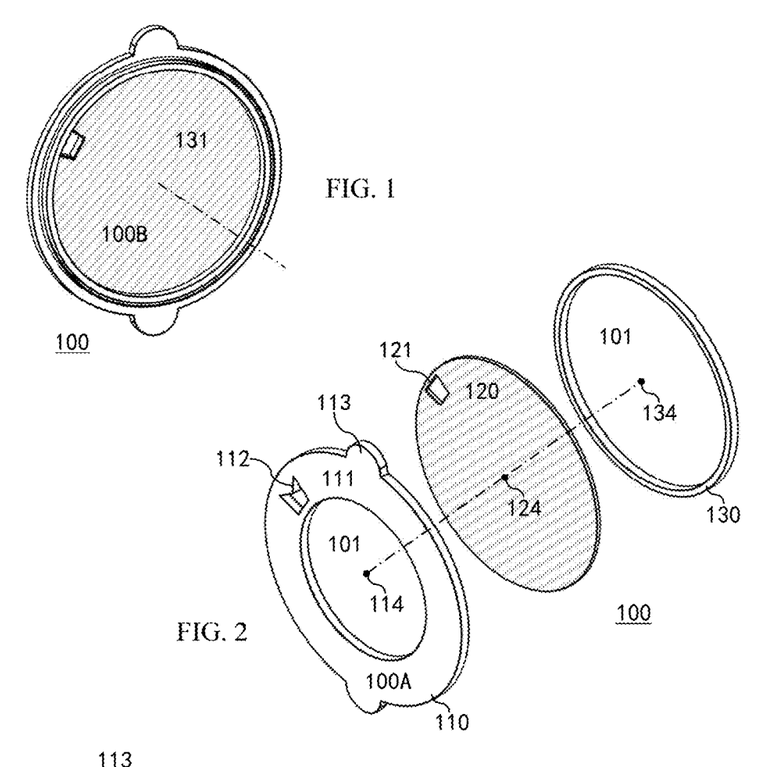
FIG. 1 is a perspective-view schematic diagram illustrating the first circular rotating polarization disk according to the present invention.
FIG. 2 is an exploded-view schematic diagram illustrating the structure for the first circular rotating polarization disk according to the present invention.
Figure 3:
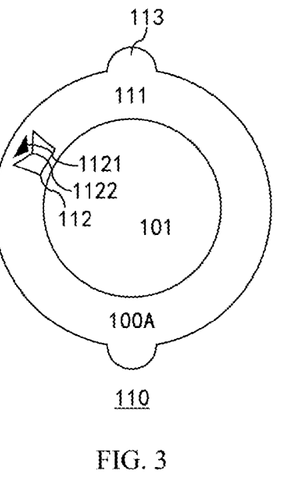
FIG. 3 is a front-view schematic diagram illustrating the structure for the first circular ring framework according to the present invention.
Figure 4:
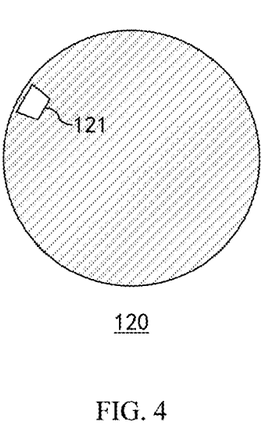
FIG. 4 is a front-view schematic diagram illustrating the first polarization film according to the present invention.
Figure 5:
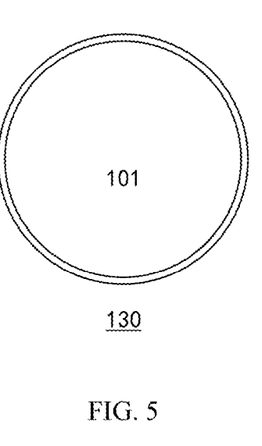
FIG. 5 is a front-view schematic diagram illustrating the positioning ring according to the present invention.
Figure 6:
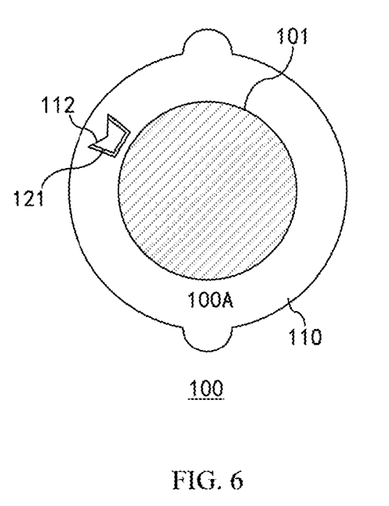
FIG. 6 and FIG. 7 are front side-view schematic diagrams illustrating the structure for the assembled first circular rotating polarization disk according to the present invention.
Figure 7:
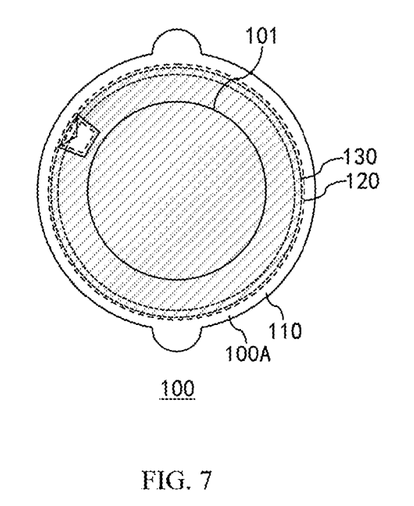

FIG. 1 is a perspective-view schematic diagram illustrating the first circular rotating polarization disk according to the present invention; FIG. 2 is an exploded-view schematic diagram illustrating the structure for the first circular rotating polarization disk according to the present invention; FIG. 3 is a front-view schematic diagram illustrating the structure for the first circular ring framework according to the present invention; FIG. 4 is a front-view schematic diagram illustrating the first polarization film according to the present invention; FIG. 5 is a front-view schematic diagram illustrating the positioning ring according to the present invention; FIG. 6 and FIG. 7 are front side-view schematic diagrams illustrating the structure for the assembled first circular rotating polarization disk according to the present invention.

Please refer to FIG. 1 to FIG. 7. The first circular rotating polarization disk 100 has a front side 100A, a first inner side 100B and a first main observation window 101 and includes at least three independent components, which are a first circular ring framework 110, a first polarization film 120 and a positioning ring 130.

The first circular ring framework 110 is a circular ring substrate for supporting both the first polarization film 120 and the positioning ring 130, and forms and surrounds the first main observation window 101 in the central hollowed portion that is surrounded by the framework 111. An angular scale observation window 112 that is opened on and through the framework 111 and preferably in a shape of polygon or rectangle. A pair of first handles 113 are further formed on the framework 111.

The angular scale observation window 112 is provided for angular scales that are printed on another circular rotating polarization disk to be exposed and to be viewed by a user or an observer. An additional indicator, for example, a triangular shape indicator symbol 1121, is printed by the angular scale observation window 112 or arrowhead shape indicator 1122 is formed on the angular scale observation window 112, so to precisely indicate the specific angular scale to be referenced currently that is exposed from the angular scale observation window 112 for users.

There are decoration patterns or functional patterns printed onto the outer side 100A on the first circular ring framework 110. Preferably, the functional patterns may be the reference angular scale or other indicators. In the present embodiment, the first circular ring framework 110 is made of but not limiting to a paper-based material.

The first polarization film 120 is a conventional polarization film and has a first polarization direction. There is an aperture 121 opened on and through the first polarization film 120. The first polarization film 120 is attached to the first circular ring framework 110 by pasting for example. Preferably, in the present embodiment, the first polarization film 120 is made of but not limiting to a PET plastic film material.

The aperture 121 has a shape that is approximately corresponded to that of the angular scale observation window 112. The aperture 121 is required to be aligned with the angular scale observation window 112, when the first polarization film 120 is attached to the first circular ring framework 110. Most polarization film in the central portion of the first polarization film 120 is exposed from the first main observation window 101.

The positioning ring 130 is a loop of circular thin ring that is attached to the first polarization film 120 by pasting for example and has an inner diameter. The first main observation window 101 is formed within and surrounded by the loop of the thin ring. Preferably the positioning ring 130 is made of but not limiting to a light alloy such as an aluminum alloy.

Typically, the first circular ring framework 110, the first polarization film 120 and the positioning ring 130 are assembled together in a concentric way such that the first center of circle 114 the first circular ring framework 110 has, the second center of circle 124 the first polarization film 120 has, and the third center of circle 134 the positioning ring 130 has virtually coincide with each other after the assembly, to form the first circular rotating polarization disk 100.

After the assembly of the first circular rotating polarization disk 100, the positioning ring 130 creates a very small and shallow cavity 131 on the first inner side 100B of the first circular rotating polarization disk 100 capable of providing for another circular rotating polarization disk to abut on and provisionally retain therein, so to cause the first circular rotating polarization disk 100 being capable of revolving relative to another circular rotating polarization disk.

Figures 8, 9:
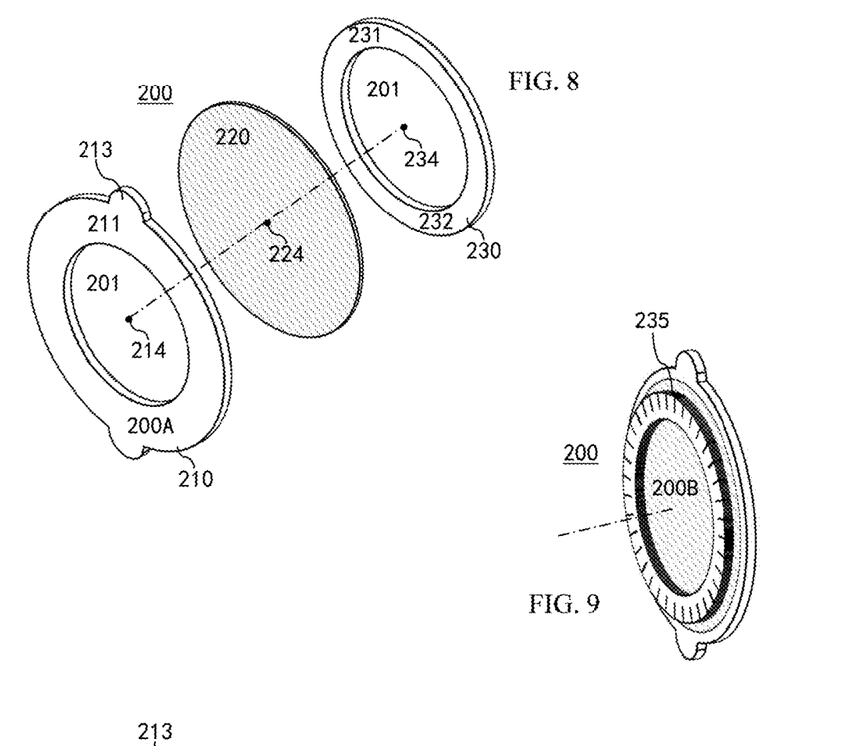
FIG. 8 is an exploded-view schematic diagram illustrating the structure for the second circular rotating polarization disk according to the present invention.
FIG. 9 is a perspective-view schematic diagram illustrating the second circular rotating polarization disk according to the present invention.
Figure 10:
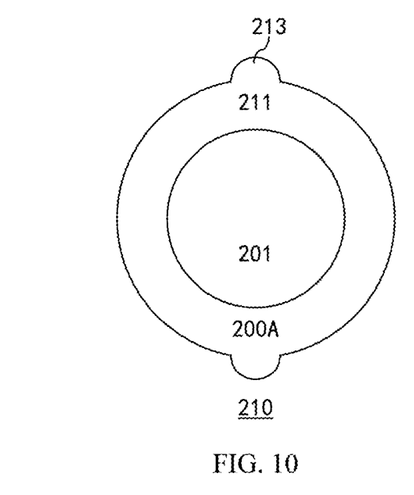
FIG. 10 is a front-view schematic diagram illustrating the structure for the second circular ring framework according to the present invention.
Figure 11:
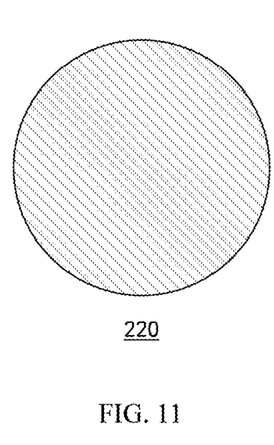
FIG. 11 is a front-view schematic diagram illustrating the second polarization film according to the present invention.
Figure 12:
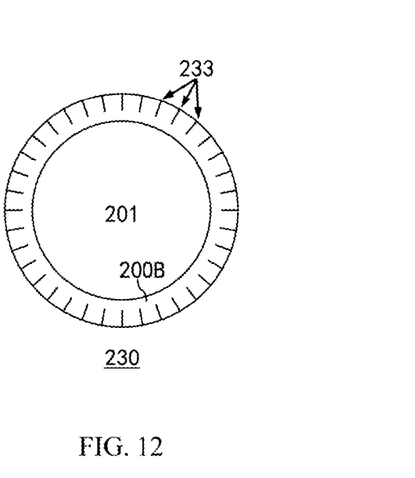
FIG. 12 is a front-view schematic diagram illustrating the angular scale ring according to the present invention.
Figure 13:
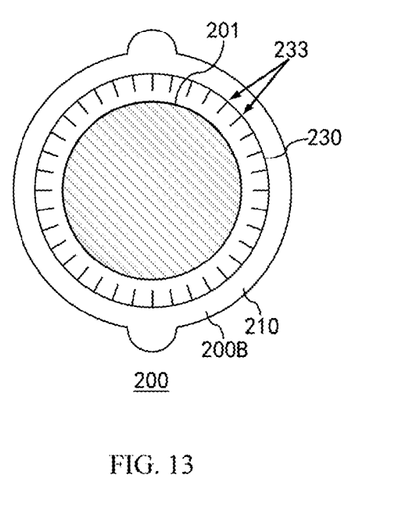
FIG. 13 is an inner side-view schematic diagram illustrating the structure for the assembled second circular rotating polarization disk according to the present invention.
Figure 14:
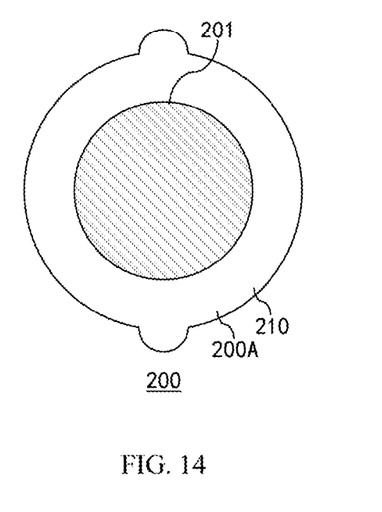
FIG. 14 is a back side-view schematic diagram illustrating the structure for the assembled second circular rotating polarization disk according to the present invention.

FIG. 8 is an exploded-view schematic diagram illustrating the structure for the second circular rotating polarization disk according to the present invention; FIG. 9 is a perspective-view schematic diagram illustrating the second circular rotating polarization disk according to the present invention; FIG. 10 is a front-view schematic diagram illustrating the structure for the second circular ring framework according to the present invention; FIG. 11 is a front-view schematic diagram illustrating the second polarization film according to the present invention; FIG. 12 is a front-view schematic diagram illustrating the angular scale ring according to the present invention; FIG. 13 is an inner side-view schematic diagram illustrating the structure for the assembled second circular rotating polarization disk according to the present invention; and FIG. 14 is a back side-view schematic diagram illustrating the structure for the assembled second circular rotating polarization disk according to the present invention.

Please refer to FIG. 8 to FIG. 14. The second circular rotating polarization disk 200 has a back side 200A, a second inner side 200B and a second main observation window 201 and includes at least three independent components, which are a second circular ring framework 210, a second polarization film 220 and an angular scale ring 230.

The second circular ring framework 210 is also a circular ring substrate for supporting both the second polarization film 220 and the angular scale ring 230, and forms and surrounds the second main observation window 201 in the central hollowed portion that is surrounded by the framework 211. A pair of second handles 213 are further formed on the framework 211.

Likewise, there are also decoration patterns or functional patterns printed onto the back side 200A on the second circular ring framework 210. Preferably, the functional patterns may be the reference angular scale or indicator. In the present embodiment, the second circular ring framework 210 is made of but not limiting to a paper-based material.

The second polarization film 220 is a conventional polarization film and has a second polarization direction. The second polarization film 220 is attached to the second circular ring framework 210 by pasting for example. Preferably, in the present embodiment, the second polarization film 220 is made of but not limiting to a PET soft plastic film material. Most polarization film in the central portion of the second polarization film 220 is exposed from the second main observation window 201, after the second polarization film 220 is attached to the second circular ring framework 210.

The angular scale ring 230 is a flat circular ring and has a loop of framework 231 and has an outer diameter less than the inner diameter on the positioning ring 130. The second main observation window 201 is formed within and surrounded by the loop of framework 231. The framework 231 has an adhesive side 232 and the second inner side 200B opposite to the adhesive side 232. The angular scale ring 230 is attached to the first polarization film 120 through the adhesive side 232 by pasting for example. Multiple angle scales 233 are formed on the second inner side 200B on the angular scale ring 230 by printing for example, and equally distributed within 0°-360° degrees.

The second circular ring framework 210, the second polarization film 220 and the angular scale ring 230 are assembled together in a concentric way such that the first center of circle 214 the second circular ring framework 210 has, the second center of circle 224 the second polarization film 220 has, and the third center of circle 234 the angular scale ring 230 has coincide with each other to form the second circular rotating polarization disk 200.

After the assembly of the second circular rotating polarization disk 200, the angular scale ring 230 is slightly protruded from the second circular ring framework 210 resulted from the body thickness that the angular scale ring 230 has to form a small protrusion portion 235 on the second inner side 200B of the second circular rotating polarization disk 200. The protrusion portion 235 has a height corresponding to the depth that the cavity 131 has.

Figure 15:
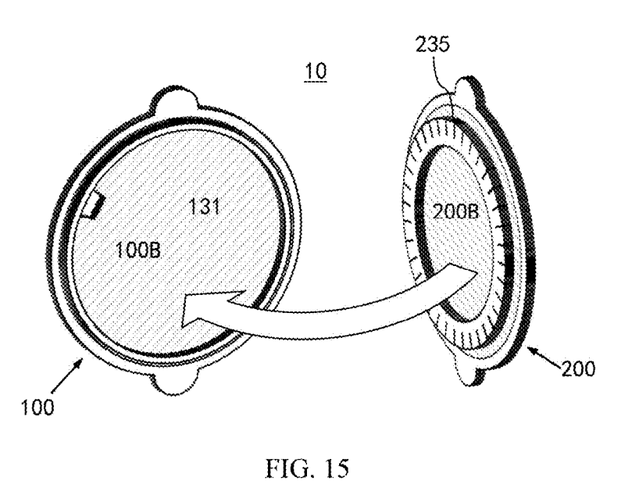
FIG. 15 is an exploded-view schematic diagram illustrating the unassembled structures for the first circular rotating polarization disk and the second circular rotating polarization disk before assembly according to the present invention.
Figure 16:
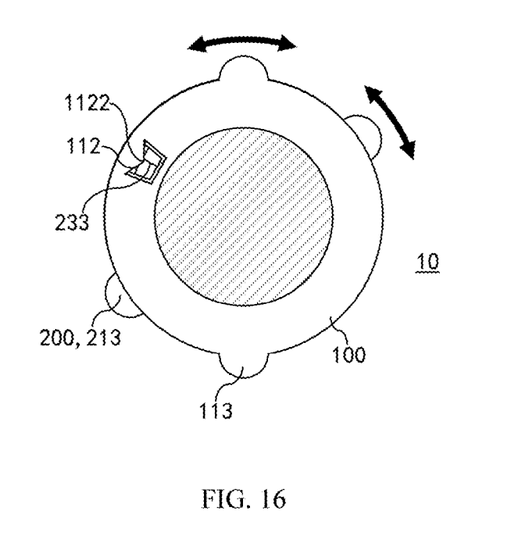
FIG. 16 is a front-view schematic diagram illustrating the assembled optical polarization effect demonstrating device according to the present invention.

FIG. 15 is an exploded-view schematic diagram illustrating the unassembled structures for the first circular rotating polarization disk and the second circular rotating polarization disk before assembly according to the present invention; FIG. 16 is a front-view schematic diagram illustrating the assembled optical polarization effect demonstrating device according to the present invention.

Please refer to FIG. 15 and FIG. 16. The optical polarization effect demonstrating device 10 according to the present invention is formed by assembling both the first circular rotating polarization disk 100 with the second circular rotating polarization disk 200, through a simply manual assembling process capable of being implementing by user at all ages including children and adults.

In order to assemble the both disks 100 and 200, in a preparation phase, the first inner side 100B on the first circular rotating polarization disk 100 and the second inner side 200B on the second circular rotating polarization disk 200 are arranged in face to face, as shown in FIG. 15. Next, the protrusion portion 235 on the second circular rotating polarization disk 200 is inserted or fitted into the cavity 131 on the first circular rotating polarization disk 100. So far, the assembling of the optical polarization effect demonstrating device 10 is finished.

After the assembling is done, one or two of the angle scales 233 are exposed from the angular scale observation window 112 and to be viewed by a user or an observer. A user can read and record the current rotating angle between the first circular rotating polarization disk 100 and the second circular rotating polarization disk 200 by viewing the angle scales 233 aligned with the arrowhead shape indicator 1122 from the angular scale observation window 112, as shown in FIG. 16.

A user can simply turn the first circular rotating polarization disk 100 to revolve relative to the second circular rotating polarization disk 200 by moving the first handles 113, or turn the second circular rotating polarization disk 200 to revolve relative to the first circular rotating polarization disk 100 by moving the second handles 213. A user can read the current rotating angle by referencing the angle scales 233 shown in the angular scale observation window 112.

By the manual turning, the first polarization direction that the first polarization film 120 on the first circular rotating polarization disk 100 has is correspondingly rotated relative to the second polarization direction that the second polarization film 220 on the second circular rotating polarization disk 200 has, and vice versa. When the first polarization direction and the second polarization direction are aligned in and enters into an orthogonal status, since the theoretical transmittance is zero, no light is capable of passing through the first polarization film 120 and the second polarization film 220. Therefore, the first main observation window 101 and the second main observation window 201 show the most darkest and blackest brightness and present an opaque status.

As long as the first polarization direction and the second polarization direction are deviated from and leaves the orthogonal status, the first main observation window 101 and the second main observation window 201 become dark, dim and opaque. When there is more deviation that the both disk 100 and 200 are rotated away from the orthogonal status occurring, the first main observation window 101 and the second main observation window 201 become more bright and clear, whereby the Malus' law is well demonstrated.

Figure 17:
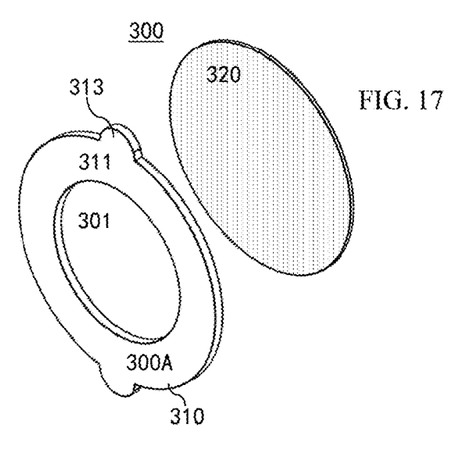
FIG. 17 is an exploded-view schematic diagram illustrating the structure for the optical thin film rotating disk according to the present invention.
Figure 18:
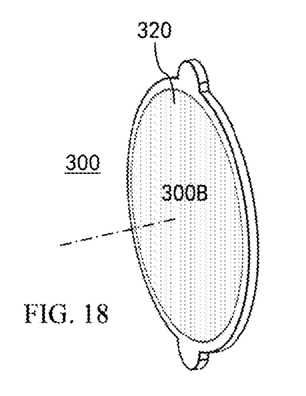
FIG. 18 is a perspective-view schematic diagram illustrating the optical thin film rotating disk according to the present invention.
Figure 19:
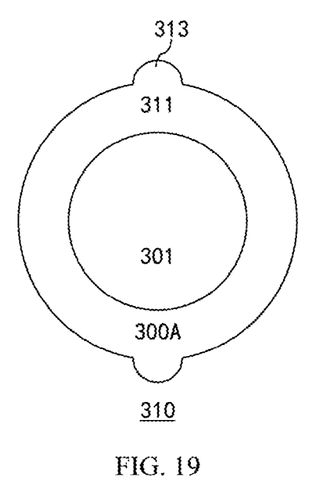
FIG. 19 is a front-view schematic diagram illustrating the structure for the thin film circular ring framework according to the present invention.
Figure 20:
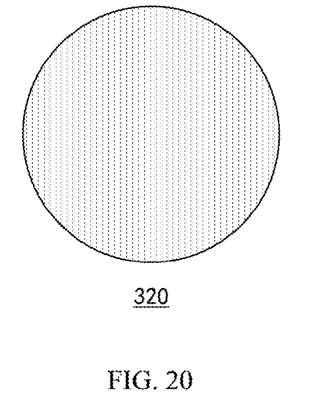
FIG. 20 is a front-view schematic diagram illustrating the optical thin film according to the present invention.

FIG. 17 is an exploded-view schematic diagram illustrating the structure for the optical thin film rotating disk according to the present invention; FIG. 18 is a perspective-view schematic diagram illustrating the optical thin film rotating disk according to the present invention; FIG. 19 is a front-view schematic diagram illustrating the structure for the thin film circular ring framework according to the present invention; and FIG. 20 is a front-view schematic diagram illustrating the optical thin film according to the present invention.

Please refer to FIG. 17 to FIG. 20. The optical polarization effect demonstrating device 10 further includes an optical thin film rotating disk 300. The optical thin film rotating disk 300 has a first side 300A, a second side 300B and a third main observation window 301 and includes at least two independent components, which are a thin film circular ring framework 310 and an optical thin film 320.

The thin film circular ring framework 310 is also a circular ring substrate for supporting the optical thin film 320, and forms and surrounds the third main observation window 301 in the central hollowed portion that is surrounded by the framework 311. A pair of third handles 313 are further formed on the framework 311. The optical thin film 320 is light-transmittable thin film including but not limiting to a tracking paper. The optical thin film 320 is attached to the thin film circular ring framework 310 by pasting for example.

Figure 21:
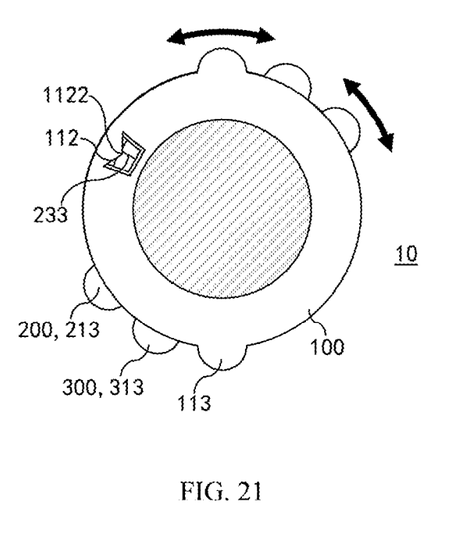
FIG. 21 is a front-view schematic diagram illustrating a joint operation of the first circular rotating polarization disk, the second circular rotating polarization disk and the optical thin film rotating disk according to the present invention.

FIG. 21 is a front-view schematic diagram illustrating a joint operation of the first circular rotating polarization disk, the second circular rotating polarization disk and the optical thin film rotating disk according to the present invention. The optical thin film rotating disk 300 is provided to interpose between the first circular rotating polarization disk 100 and the second circular rotating polarization disk 200.

When the first circular rotating polarization disk 100 and the second circular rotating polarization disk 200 is in the orthogonal status, as described above, it is supposed that the first main observation window 101 and the second main observation window 201 show dark black and present an opaque status. A user cannot see any background scenery behind the windows 101 and 201.

However, in such an orthogonal status, if the optical thin film rotating disk 300 is inserted into the gap between the first circular rotating polarization disk 100 and the second circular rotating polarization disk 200, the optical activity in the optical system consisting of the first circular rotating polarization disk 100 and the second circular rotating polarization disk 200 is significantly enhanced due to an increasing of a transmittance induced by a birefringence effect resulted from the optical thin film 320. The first main observation window 101, the second main observation window 201 and third main observation window 301 turns from an opaque status into a transparent status all of a sudden, and become brighter and clear. A user now can view the scenery behind the three windows 101, 201 and 301. The Malus' Law is again demonstrated by the optical polarization effect demonstrating device 10 perfectly.

To sum up, the present device 10 is simply built up by incorporating at least two handheld circular disks to form a simple but useful teaching aid. By cooperating with additional simple light intensity meter or a simple photometric tool, such as, the light intensity meter application program (App) running on the smart phone, to quantify changes in illuminance, users and learners can quantitatively measure and visually and clearly see the variation relationship of the polarization angle with respect to the illuminance in Marius' law emitting from the main observation windows. Through operating the pair of palm-sized disks, the present device 10 can reach the same excellent experimental result that is competitive with that of traditional large scale and sophisticated experimental instruments can be achieved.

The present invention is characterized by light weight and visualization and further has more characteristics as follows: handheld; portable; miniaturized; paper-based; printing-made; non-electronic device; and non-electric driven.

There are further embodiments provided as follows.

Embodiment 1: An optical polarization effect demonstrating device, includes: a first circular rotating polarization disk including a first main observation window and a first polarization film having a first polarization direction viewable through the first circular observation window; and a second circular rotating polarization disk including a second main observation window and a second polarization film having a second polarization direction viewable through the second circular observation window, wherein the first circular rotating polarization disk and the second circular rotating polarization disk are rotatably assembled in a concentric way such that the first circular rotating polarization disk and the second circular rotating polarization disk are rotatable with each other, and the first polarization direction is different from the second polarization direction.

Embodiment 2: The optical polarization effect demonstrating device as described in Embodiment 1, the first circular rotating polarization disk further includes: a first circular ring framework having a circular ring framework and forming and surrounding the first circular observation window; the first polarization film having a first polarization direction, attached to the circular ring framework and shown through the first circular observation window; and a positioning ring attached to the first polarization film, having an inner diameter and forming and surrounding the first circular observation window.

Embodiment 3: The optical polarization effect demonstrating device as described in Embodiment 2, after the positioning ring is attached to the first polarization film, a cavity is formed by the positioning ring on the first circular rotating polarization disk.

Embodiment 4: The optical polarization effect demonstrating device as described in Embodiment 3, the second circular rotating polarization disk further includes: a second circular ring framework having a framework and forming and surrounding the second circular observation window; the second polarization film having a second polarization direction, attached to the framework and shown through the second circular observation window; and an angular scale ring attached to the second polarization film, having an outer diameter less than the inner diameter and forming and surrounding the second circular observation window, wherein the angular scale ring includes a plurality of angle scales distributed between 0°-360° degrees.

Embodiment 5: The optical polarization effect demonstrating device as described in Embodiment 4, after the angular scale ring is attached to the second polarization film, a protrusion is formed by the angular scale ring on the second circular rotating polarization disk.

Embodiment 6: The optical polarization effect demonstrating device as described in Embodiment 4, an angular scale observation window is opened on and through the circular ring framework and corresponded to the plurality of angle scales included in the angular scale ring in position.

Embodiment 7: The optical polarization effect demonstrating device as described in Embodiment 5, the first circular rotating polarization disk and the second circular rotating polarization disk are assembled together by inserting the protrusion formed by the angular scale ring into the cavity formed by the positioning ring, to enable the first circular rotating polarization disk and the second circular rotating polarization disk to be freely rotatable with each other.

Embodiment 8: The optical polarization effect demonstrating device as described in Embodiment 1, further includes one of: an optical thin film disk including an optical thin film; and the optical thin film disk interposed between the first circular rotating polarization disk and the second circular rotating polarization disk.

Embodiment 9: The optical polarization effect demonstrating device as described in Embodiment 1, the first circular rotating polarization disk and the second circular rotating polarization disk are driven to revolve with each other by an external force applied by a user, and when the first polarization direction and the second polarization direction is driven to enter into an orthogonal status, the first main observation window and the second main observation window correspondingly enter into a dark status showing opaque.

Embodiment 10: The optical polarization effect demonstrating device as described in Embodiment 4, the first circular ring framework, the second circular ring framework, the positioning ring and the angular scale ring include a material selected from a paper based material, a PET based material, a PE based material, a HDPE based material, a PVC based material, a PP based material, a PC based material, a PLA based material, a metal alloy and a combination thereof.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An optical polarization effect demonstrating device, comprising:
   a first circular rotating polarization disk comprising a first circular ring framework having a circular ring framework and forming and surrounding a first circular observation window, a first main observation window, a first polarization film having a first polarization direction viewable through the first circular observation window, and a positioning ring attached to the first polarization film, having an inner diameter and forming and surrounding the first circular observation window; and
   a second circular rotating polarization disk comprising a second circular ring framework having a framework and forming and surrounding a second circular observation window, a second main observation window, a second polarization film having a second polarization direction viewable through the second circular observation window, and an angular scale ring attached to the second polarization film, having an outer diameter less than the inner diameter and forming and surrounding the second circular observation window,
   wherein the first circular rotating polarization disk and the second circular rotating polarization disk are rotatably assembled in a concentric way such that the first circular rotating polarization disk and the second circular rotating polarization disk are rotatable with each other, and the first polarization direction is different from the second polarization direction, and an angular scale observation window is opened on and through the circular ring framework on the first circular ring framework and corresponded to the plurality of angle scales comprised in the angular scale ring on the second circular ring framework in position.

2. The optical polarization effect demonstrating device as claimed in claim 1, wherein the first circular rotating polarization disk further comprises:

the first polarization film having a first polarization direction, attached to the circular ring framework and shown through the first circular observation window.

3. The optical polarization effect demonstrating device as claimed in claim 2, wherein after the positioning ring is attached to the first polarization film, a cavity is formed by the positioning ring on the first circular rotating polarization disk.

4. The optical polarization effect demonstrating device as claimed in claim 3, wherein the second circular rotating polarization disk further comprises:
the second polarization film having a second polarization direction, attached to the framework and shown through the second circular observation window; and
the angular scale ring further comprising a plurality of angle scales distributed between 0° ~360° degrees.

5. The optical polarization effect demonstrating device as claimed in claim 4, wherein after the angular scale ring is attached to the second polarization film, a protrusion is formed by the angular scale ring on the second circular rotating polarization disk.

6. The optical polarization effect demonstrating device as claimed in claim 5, wherein the first circular rotating polarization disk and the second circular rotating polarization disk are assembled together by inserting the protrusion formed by the angular scale ring into the cavity formed by the positioning ring, to enable the first circular rotating polarization disk and the second circular rotating polarization disk to be freely rotatable with each other.

7. The optical polarization effect demonstrating device as claimed in claim 1, further comprising:
an optical thin film disk comprising an optical thin film; and
the optical thin film disk interposed between the first circular rotating polarization disk and the second circular rotating polarization disk.

8. The optical polarization effect demonstrating device as claimed in claim 1, wherein the first circular rotating polarization disk and the second circular rotating polarization disk are driven to revolve with each other by an external force applied by a user, and when the first polarization direction and the second polarization direction is driven to enter into an orthogonal status, the first main observation window and the second main observation window correspondingly enter into a dark status showing opaque.

* * * * *